United States Patent [19]
Yokokoji et al.

[11] Patent Number: 4,925,634
[45] Date of Patent: May 15, 1990

[54] CATALYTIC CONVERTER FOR USE WITH INTERNAL COMBUSTION ENGINE

[75] Inventors: Osamu Yokokoji, Tsu; Masuo Fukuda, Omiya, both of Japan

[73] Assignee: Sankei Giken Kogyo Kabushiki Kaisha, Japan

[21] Appl. No.: 225,567

[22] Filed: Jul. 25, 1988

Related U.S. Application Data

[63] Continuation of Ser. No. 599,280, Apr. 11, 1984, abandoned.

[30] Foreign Application Priority Data

May 13, 1983 [JP] Japan .................. 58-83905

[51] Int. Cl.$^5$ .......................... B01J 8/00; F01N 3/10
[52] U.S. Cl. ...................................... 422/179; 422/180
[58] Field of Search .............................. 422/177–180, 422/221, 222; 29/427, 525, 455; 60/299

[56] References Cited

U.S. PATENT DOCUMENTS

| | | | |
|---|---|---|---|
| 3,854,888 | 12/1974 | Frietzsche et al. | 422/180 |
| 3,958,312 | 5/1976 | Weaving et al. | 422/177 |
| 4,050,903 | 9/1977 | Bailey et al. | 60/299 |
| 4,124,357 | 11/1978 | Akimoto et al. | 422/179 |
| 4,155,980 | 5/1979 | Santiago et al. | 422/179 |
| 4,188,783 | 2/1980 | Sayo et al. | 422/179 |
| 4,278,639 | 7/1981 | Tadokoro et al. | 422/179 |
| 4,322,388 | 3/1982 | Hardin et al. | 422/180 |
| 4,432,943 | 2/1984 | Musall et al. | 422/180 |

FOREIGN PATENT DOCUMENTS

| | | | |
|---|---|---|---|
| 312200 | 5/1929 | United Kingdom | 60/299 |
| 2047557 | 12/1980 | United Kingdom | 422/180 |

*Primary Examiner*—Michael S. Marcus
*Attorney, Agent, or Firm*—Thomas R. Vigil

[57] ABSTRACT

A monolithic catalyst converter for use with a car, motorcycle or the like for purifying exhaust gas emanating therefrom. A cylindrical casing is made up of longitudinally divided cylindrical casing halves and stores a catalyst carrier which is wrapped in a retainer member. Flanges extend on each of the casing halves in the lengthwise direction of the casing. Predetermined magnitudes of load are applied in predetermined directions to the cylindrical casing to mate the flanges to each other and, in the mating position, the flanges are rigidly connected to each other.

3 Claims, 4 Drawing Sheets

CATALYTIC CONVERTER FOR USE WITH INTERNAL COMBUSTION ENGINE

This is a continuation of application Ser. No. 06/599,280, filed Apr. 11, 1984 abandoned.

BACKGROUND OF THE INVENTION

1. Field of the Invention

The present invention generally relates to a catalytic converter for use with an internal combustion engine to purify exhaust gas emanating therefrom and, more particularly, to a monolithic catalytic converter of the type which uses a honeycomb catalyst carrier.

2. Description of the Prior Art

In a catalytic converter of the type described, a catalyst carrier is housed in a retainer member which is formed of a stainless steel mesh, or in a foamed mat, such as ceramic wool available in the trade name INTERAM MAT from 3M Co. Ltd., U.S.A. The catalyst carrier is put in a generally cylindrical split casing which consists of two casing halves, together with seal members for sealing opposite ends of the casing. The abutting faces of the casing halves are welded or otherwise joined to each other. For details of such a catalytic converter, a reference may be made to Japanese Patent Laid-Open Publication Nos. 212319/1982 and 2412/1983.

Meanwhile, a honeycomb catalyst carrier employed with such a catalytic converter comprises a sintered integral body mainly consisting of $SiO_2$, $Al_2O_3$ and $MgO$ and, therefore, it lacks resistivity against shocks and impacts. In addition to the fragility, the dimensional accuracy of finished honeycomb catalyst carriers is quite rough. For example, where catalyst carriers each having a circular cross-section are produced with a designed diameter of 65 millimeters, the scattering or expected diameter deviation in the actual diameters of the products amounts to a little over 2 millimeters; where catalyst carriers each having an oval cross-section are produced with a designed shorter diameter of 65 millimeters and a longer diameter of 130 millimeters, the scatterings or expected diameter deviations in the two diameters individually amount to a little over 4 millimeters.

Assume a case wherein a catalyst carrier of the type discussed is loaded in the prior art split casing in which the casing halves are clamped together with a predetermined margin at abutting ends thereof. Then, if the catalyst carrier is relatively large-size, the clamping load will be excessive and damage the catalyst carrier while, if the catalyst carrier is relatively small-size, the clamping load will be short and only loosely retain the catalyst carrier to enhance the liability to damage, due to the severe scatterings situation discussed above. The excessive or short clamping load, therefore, is incapable of allowing the prior art catalytic converter to fully exhibit its expected function. While this problem may be solved by increasing or decreasing the number of the retainer members and/or that of the seal members after actually measuring the dimensions of each catalyst carrier such that a predetermined clamping load acts adequately on all the catalyst carriers, such an implementation will increase the number of assembling steps to a degree which is objectionable for quantity production.

SUMMARY OF THE INVENTION

It is therefore an object of the present invention to provide a new and improved catalytic converter for an internal combustion engine which eliminates the drawbacks inherent in the prior art catalytic converter for an internal combustion engine as stated above.

It is another object of the present invention to provide a catalytic converter for an internal combustion engine which is feasible for quantity production.

It is still another object of the present invention to provide a catalytic converter for an internal combustion engine which is stable in quality and desirable in durability.

According to the invention there is provided an insulated, muffled, straight-line flow catalytic converter which is formed under a constant load for high quantity production, consisting essentially of:

a generally cylindrical catalyst carrier having an approximate dimension of length and an approximate dimension of diameter which may be less than, greater than or equal to a desired diameter and which falls within an expected diameter deviation, and having a longitudinal central axis;

a circumferential retainer member resiliently surrounding substantially the given length of said catalyst carrier;

a first generally hemicylindrical casing half extending through approximately 180° about said central axis and terminating in a pair of longitudinal ends each having a radially extending annular end flange, said casing half being longer than the length of said carrier and terminating at the side edges thereof in a pair of longitudinally extending end faces, said casing half having on each side thereof as longitudinal flange extending substantially the length of said casing half, each longitudinal flange including a generally planar coupling wall portion having said longitudinally extending end face;

a second generally hemicylindrical casing half extending through approximately 180° about said central axis and terminating in a pair of longitudinal ends each having a radially extending annular end flange; said second casing half being longer than the length of the carrier and terminating at the side edges thereof in a pair of longitudinally extending end faces, said second casing half having a radially outwardly extending longitudinal flange extending longitudinally substantially the length of said second casing half and having an inner face and each longitudinal flange terminating in a generally perpendicular flange including a generally planar coupling wall portion extending generally perpendicular to and substantially the length of said longitudinal flange and extending a tangential distance sufficient to overlap the adjacent coupling wall portion with a clamping margin between each end face of said coupling wall portion of said first casing half and said inner face of said longitudinal flange of said second casing half defining a spacing which allows for different diameter catalyst carriers to be mounted within said first and second casing halves;

said first casing half and said second casing half being adapted to retain and circumferentially surround said carrier and said retainer member when a predetermined load is applied with said adjacent coupling wall portions being in mating and overlapping relationship and with the distance of overlap being greater than said clamping margin but sufficient to retain said carrier in a fixed position within the cylindrical casing having said annular end flanges and being formed by said mated casing halves regardless of the expected diameter deviation of the diameter of the catalyst carrier received in said casing and with said adjacent coupling wall portions having a sufficient amount of overlap to accommodate catalyst carriers of different diameters;

first and second short cylindrical tubes, each having the same diameter which is greater than a diameter of said, annular end flanges of said generally cylindrical casing and each having a radially inwardly extending flange surrounding an orifice which is in a plane perpendicular to said central axis, each short tube being individually affixed along an inner periphery of an outwardly facing surface of said flange of said tube to an adjacent outwardly facing surface of one of said annular end flanges of said generally cylindrical casing; and an elongate outer tube extending circumferentially about said central axis, said first and second short tubes having said cylindrical casing joined thereto between said first and second short tubes, and being received within said outer tube t form a heat insulating chamber between said cylindrical casing and said outer tube, said outer tube extending longitudinally beyond said short tubes to form at least two muffling chambers, one between said first short tube and a first end of said outer tube and another between said second short tube and a second end of said outer tube.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENTS

Figure 1:
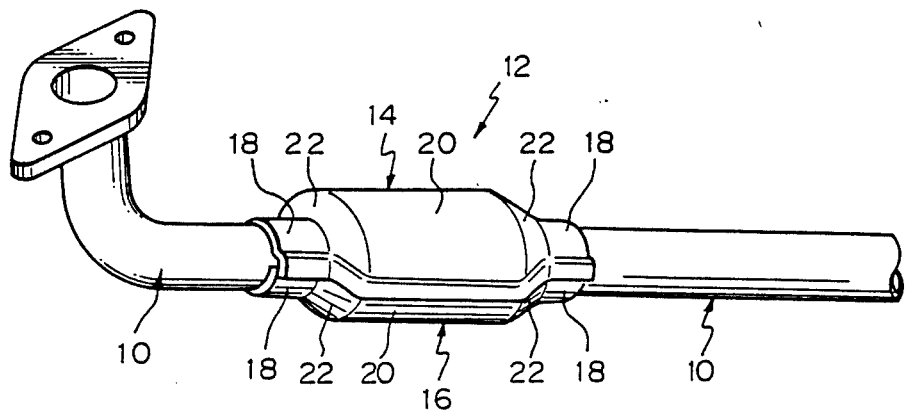
FIG. 1 is a perspective view showing an exhaust system of an internal combustion engine which is equipped with a catalytic converter.
Figure 2:
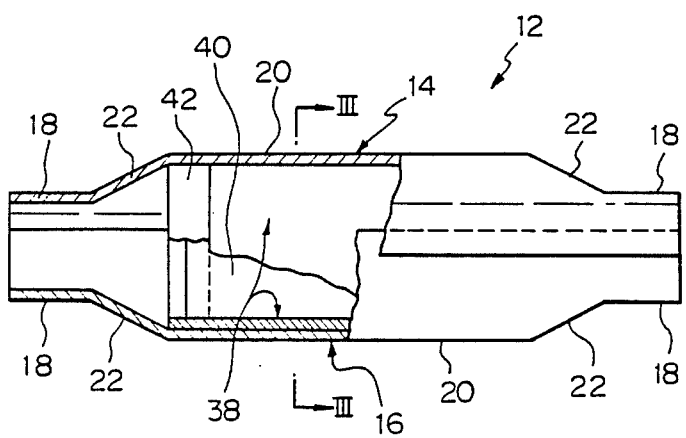
FIG. 2 is a side elevational view of a catalytic converter for an internal combustion engine in accordance with the present invention with portions broken away.
Figure 3:
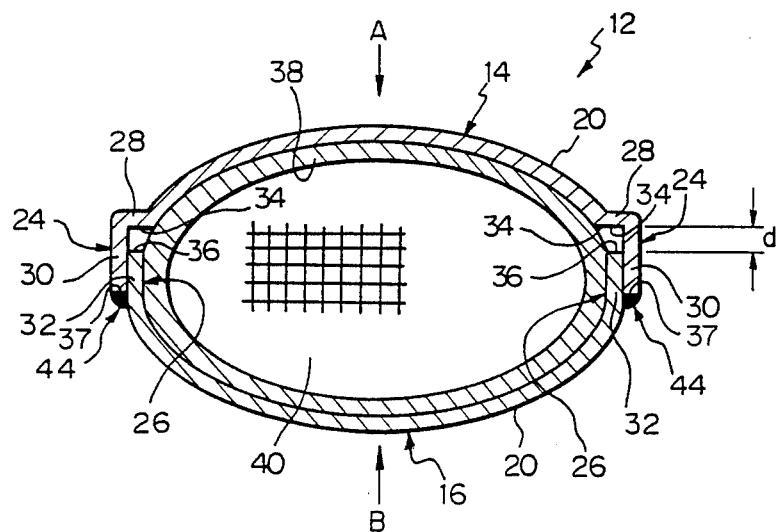
FIG. 3 is a cross-section view taken along line III—III of FIG. 2.

Referring to FIG. 1 of the drawings, an exhaust system 10 of an internal combustion engine is shown and includes a generally cylindrical catalytic converter 12 in accordance with the present invention. The catalytic converter 12 is shown in a partly taken-away sectional side elevation in FIG. 2. As shown, the catalytic converter 12 comprises casing halves 14 and 16 which are divided from each other in the lengthwise direction of the catalytic converter 12. The catalytic converter 12 includes a body portion 20 having a generally cylindrical wall. The body portion 20 is tapered at opposite ends thereof to terminate at a pair of connecting portions 18, which are individually fit on the engine exhaust system 10. Each of the connecting portions 18 is smaller in diameter than the body portion 20. The tapered portions intervening between the body portion 20 and the opposite connecting portions 18 are designated by the reference numeral 22. p As shown in FIG. 3, the casing half 14 is formed with flanges 24 along the length thereof, and the casing half 16 with flanges 26 along the length thereof. Each of the flanges 24 comprises a bent wall portion 28 extending from the cylindrical wall of the body portion 20 of the casing half 14, and a coupling wall portion 30 extending from and perpendicular to the bent wall portion 28. That is, the coupling wall portions 30 of the flanges 24 extend over a predetermined length and are parallel to each other in a direction indicated by an arrow A which is perpendicular to the lengthwise direction of the body portion 20. Meanwhile, the flanges 26 comprise coupling wall portions 32 which extend over a predetermined length from the cylindrical wall of the body 20 parallel to each other and in a direction indicated by an arrow B, which is perpendicular to the lengthwise direction of the body portion 20. The casing halves 14 and 16 are assembled together with the inner surfaces of the coupling wall portions 30 of the flanges 24 respectively engaged with the outer surfaces of the coupling wall portions 32 of the flanges 26. The reference character d in the drawing indicates a spacing, or clamping margin, defined between an inner face 34 of each bent wall portion 28 of the flange 24 and an end face 36 of the adjacent coupling wall portion 32 of the flange 26 when the casing halves 14 and 16 are put together each flange 24 extends tangentially to a circumferential, longitudinally extending, side end face 37.

In assembly, a honeycomb catalyst carrier 40 which is housed in a retainer member 38 is put into the body portions 20 of the casing halves 14 and 16. The retainer member 38 may be made of thermo-foaming resin, for example. Then, wire nets or like seal members 42 (see FIG. 2) are placed in the body portion 20 adjacent to the opposite tapered portions 22. Members 42 are generally cylindrical in shape, have a shorter length than that of catalyst carrier 40, and function as a cushion, and sometimes a seal, for catalyst carrier 40. After the flanges 24 and 26 of the casing halves 14 and 16 have been partly engaged with each other, predetermined magnitudes of loads are applied to the casing halves 14 and 16 in the directions A and B respectively. The magnitudes of the loads are such that they are prevented from destroying or deforming the catalyst carrier 40 or the seal members 42 accommodated in the casing assembly. As a result, the flanges 24 and 26 are forced deeper into each other with their wall surfaces held in contact, until they neighbor each other with the spacing d left therebetween. In order to rigidly connect the casing halves 14 and 16 while maintaining the spacing d, the coupling wall portions 30 and 32 of the flanges 24 and 26 are welded or otherwise jointed, as indicated by reference numeral 44 in FIGS. 3 and 4.

Figure 4:
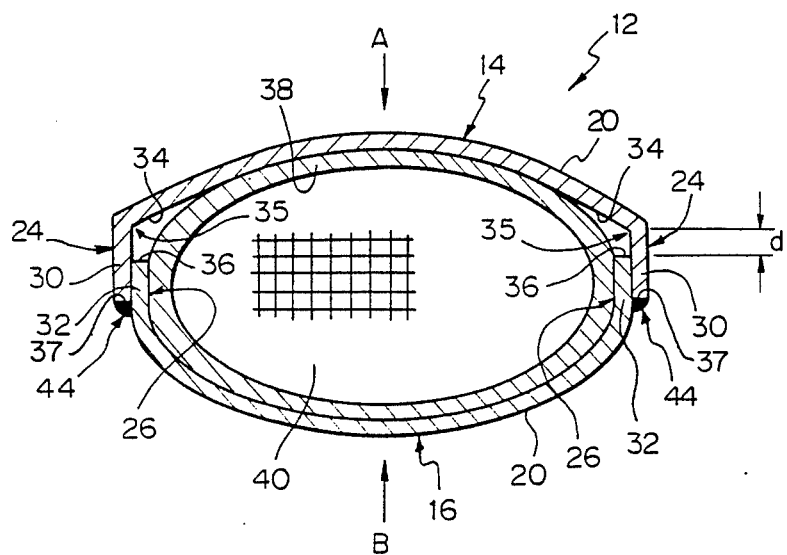
FIG. 4 and 5 are cross-sectional views showing modifications to the catalytic converter shown in FIGS. 2 and 3.

The bent wall portions 28 included in the embodiment of FIG. 3 may be omitted and, instead, the cylindrical wall of the body portion 20 of the casing half 14 may itself be bent in the direction A as shown in FIG. 4. Then, the clamping margin d will be defined between a bent portion 35 where the cylindrical wall of the body portion 20 of the casing half 14 connects to the coupling wall portion 30 of the flange 24 and the end face 36 of the coupling wall portion 32 of the flange 26.

In the catalytic converter 12 in accordance with the present invention, although the catalyst carrier 40 held by the retainer member 38 and the seal members 42 may involve some scatterings in size, the scatterings will be effectively absorbed because the loads applied to the casing halves 14 and 16 are constant and because the clamping margin d is formed when the flanges 24 and 26 of the casing halves 14 and 16 are coupled with each other. Additionally, a certain desirable clamping load acting on the members disposed in the casing halves 14 and 16 is effective to securely fix them in place without damaging them or moving or dislocating them in an undesirable space, which would otherwise be produced when the casing halves 14 and 16 are coupled shallowly.

Figure 5:
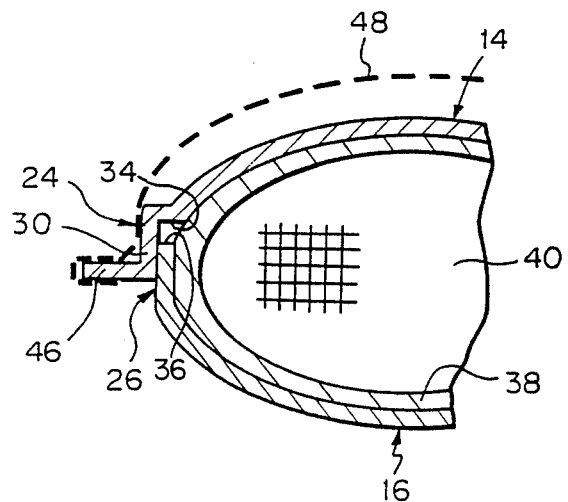

As shown in FIG. 5, part of the coupling wall portion 30 of each flange 24 may be bent perpendicular to the rest to form an ear 46. This will allow an insulator, such as a cause protecting net, 48 to be anchored to the ear 46 for the purpose of covering the outer periphery of the casing.

While the casing halves 14 and 16 have been shown and described as constituting a catalytic converter assembly 12 which has an oval cross-section, they may be configured to provide the assembly with a substantially circular cross-section as will be described with reference to FIGS. 6 and 7 hereinafter.

Figure 6:
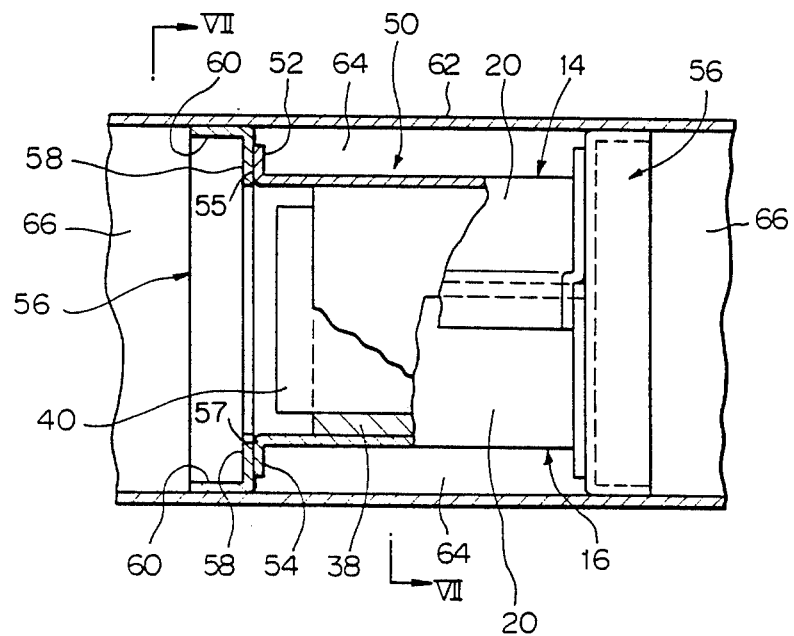
FIG. 6 is a cross-sectional view of another embodiment of the present invention.
Figure 7:
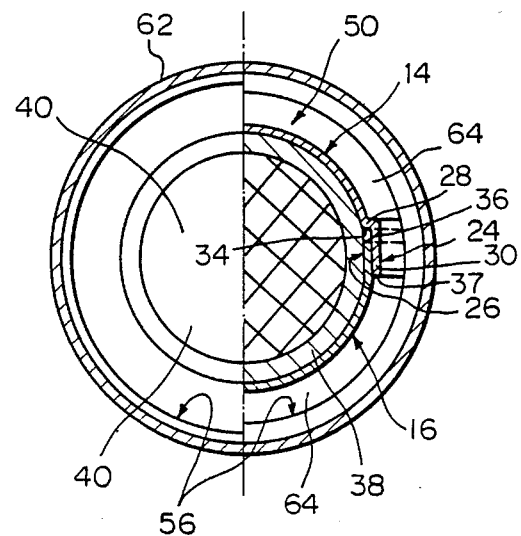
FIG. 7 is a cross-sectional view taken along line VII—VII of FIG. 6.

Referring to FIGS. 6 and 7, a catalytic converter in accordance with another embodiment of the present invention is shown which is particularly suitable for use with an engine exhaust system of a motorcycle. In these drawings, the same structural elements as those of the first embodiment are designated by like reference numerals and the procedure for assembling two casing halves is essentially identical with the procedure of the first embodiment, and, therefore, description thereof will be omitted for simplicity. In a catalytic converter, generally 50, while the casing body portions 20 for storing the catalyst carrier 40 which is held by the retainer 38 are constructed in substantially the same manner as those of the first embodiment, the tapered portions 22 and coupling portions 18 are absent in the second embodiment. Instead, in the second embodiment, radially outwardly extending flanges 52 and 54 are respectively formed at opposite ends 55, 57 of the casing bodies 20, i.e., opposite ends 55 of the casing half 14 and opposite ends 57 of the casing half 16. The adjacent flanges 52 and 54 are individually connected to an annular, radially inwardly extending flange 58 of a short tubular member 56 which is adapted to mount the catalytic converter 50 at each end of the assembly. The short tube 56 is larger in diameter than the body portions 20 of the catalytic converter 50.

The short tube 56 also has an annular flange 60 which is fit in and rigidly connected to an outer tube 62 whose inside diameter is substantially equal to or larger than the outside diameter of the short tube 56. In this construction, an annular chamber 64 is defined between the outer tube 62 and the casing halves 14 and 16, and a chamber 66 between the outer tube 62 and each short tube 56.

Concerning a motorcycle, a catalytic converter is usually confined directly in a muffler due to design and appearance limitations. The catalytic converter 50 shown in FIGS. 6 and 7 has a construction which conforms to such a situation particular to a motorcycle. The outer tube 62 constitutes a muffler, the short tube 56 constitutes a partition, and the chambers 64 and 66 serve as muffling chambers (expansion chambers). Disposed inside the intermediate muffling chamber 64, the catalytic converter 50 effectively prevents the surface of the outer tube, or muffler, 62 from being burned or thermally damaged, thereby remarkably increasing the durability of the exhaust system.

Figure 8:
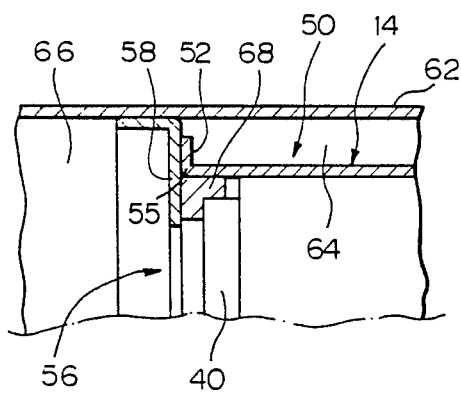
FIG. 8 is a fragmentary sectional view showing a modification to the catalytic converter shown in FIGS. 6 and 7.

If desired, as shown in FIG. 8, an annular cushioning member 68 may be disposed between the inwardly extending annular flange 58 of the short tube 56, catalyst carrier 40 and the casing halves 14 and 16.

Thus, in accordance with the present invention, a maximum load (breakdown load) allowable for the catalyst carrier and optimum load for the retainer member and seal members are measured first and, then, the magnitudes of constant loads to be applied to the casing halves in predetermined directions are predetermined based on the resulting data. Further, because the flanges formed on the casing halves have a predetermined length, some dimensional scatterings of the members disposed in the casing assembly can be coped with by suitably adjusting the degree of fitting the flanges. That is, the scatterings will be effectively absorbed by connecting the casing halves in such a coupled position that the spacing, or clamping margin, d is at least larger than zero and of a value which allows the flanges to be coupled. This eliminates the need for setting the margin product by product as in prior art catalytic converters, while preventing the members stored in the casing from being damaged or dislocated thereinside. Therefore, the catalytic converter in accordance with the present invention is stable in quality and excellent in durability.

What we claim is:

1. An insulated, muffled, straight-line flow catalytic converter which is formed under a constant load for high quantity production, consisting essentially of:

a generally cylindrical catalyst carrier having an approximate dimension of length and an approximate dimension of diameter which may be less than, greater than or equal to a desired diameter and which falls within an expected diameter deviation, and having a longitudinal central axis;

a circumferential retainer member resiliently surrounding substantially the given length of said catalyst carrier;

a first generally hemicylindrical casing half extending through approximately 180° about said central axis and terminating in a pair of longitudinal ends each having a radially extending annular end flange, said casing half being longer than the length of said carrier and terminating at the side edges thereof in a pair of longitudinally extending end faces, said casing half having on each side thereof a longitudinal flange extending substantially the length of said casing half, each longitudinal flange including a generally planar coupling wall portion having said longitudinally extending end face;

a second generally hemicylindrical casing half extending through approximately 180° about said central axis and terminating in a pair of longitudinal ends each having a radially extending annular end flange; said second casing half being longer than the length of the carrier and terminating at the side edges thereof in a pair of longitudinally extending end faces, said second casing half having a radially outwardly extending longitudinal flange extending longitudinally substantially the length of said second casing half and having an inner face and each longitudinal flange terminating in a generally perpendicular flange including a generally planar coupling wall portion extending generally perpendicular to and substantially the length of said longitudinal flange and extending a tangential distance sufficient to overlap the adjacent coupling wall portion with a clamping margin between each end face of said coupling wall portion of said first casing half and said inner face of said longitudinal flange of said second casing half defining a spacing which allows for different diameter catalyst carriers to be mounted within said first and second casing halves;

said first casing half and said second half being adapted to retain and circumferentially surround said carrier and said retainer member when a predetermined load is applied with said adjacent coupling wall portions being in mating and overlapping relationship and with the distance of overlap being greater than said clamping margin but sufficient to retain said carrier in a fixed position within the cylindrical casing having said annular end flanges and being formed by said mated casing halves regardless of the expected diameter deviation of the diameter of the catalyst carrier received in said casing and with said adjacent coupling wall portions having a sufficient amount of overlap to accommodate catalyst carriers of different diameters;

first an second short cylindrical tubes, each having the same diameter which is greater than a diameter of said, annular end flanges of said generally cylindrical casing and each having a radially inwardly extending flange surrounding an orifice which is in a plane perpendicular to said central axis, each short tube being individually affixed along an inner periphery of an outwardly facing surface of said flange of said tube to an adjacent outwardly facing surface of one of said annular end flanges of said generally cylindrical casing; and an elongate outer tube extending circumferentially about said central axis, said first and second short tubes having said cylindrical casing joined thereto between said first and second short tubes, and being received within said outer tube to form a heat insulating chamber between said cylindrical casing and said outer tube, said outer tube extending longitudinally beyond said short tubes to form at least two muffling chambers, one between said first short tube and a first end of said outer tube and another between said second short tube and a second end of said outer tube.

2. An insulated, muffled, straight-line flow catalytic converter which is formed under a constant load for high quantity production, consisting essentially of:

a generally cylindrical catalyst carrier having an approximate dimension of length and an approximate dimension of diameter which may be less than, greater than or equal to a desired diameter and which falls within an expected diameter deviation, and having a longitudinal central axis;

a circumferential retainer member resiliently surrounding substantially the given length of said catalyst carrier;

a first generally hemicylindrical casing half extending through approximately 180° about said central axis and terminating in a pair of longitudinal ends each having a radially extending annular end flange, said casing half being longer than the length of said carrier and terminating at the side edges thereof in a pair of longitudinally extending end faces, said casing half having on each side thereof a longitudinal flange extending substantially the length of said casing half, each longitudinal flange including a generally planar coupling wall portion having said longitudinally extending end face;

a second generally hemicylindrical casing half extending through approximately 180° about said central axis and terminating in a pair of longitudinal ends each having a radially extending annular end flange; said second casing half being longer than the length of the carrier and terminating at the side edges thereof in a pair of longitudinally extending end faces, said second casing half having a radially outwardly extending longitudinal flange extending longitudinally substantially the length of said second casing half and having an inner face and each longitudinal flange terminating in a generally perpendicular flange including a generally planar coupling wall portion extending generally perpendicular to and substantially the length of said longitudinal flange and extending a tangential distance sufficient to overlap the adjacent coupling wall portion with a clamping margin between each end face of said coupling wall portion of said first casing half and said inner face of said longitudinal flange of said second casing half defining a spacing which allows for different diameter catalyst carriers to be mounted within said first and second casing halves;

said first casing half and said second casing half being adapted to retain and circumferentially surround said carrier and said retainer member when a predetermined load is applied with said adjacent coupling wall portions being in mating and overlapping relationship and with the distance of overlap being greater than said clamping margin but sufficient to retain said carrier in a fixed position within the cylindrical casing having said annular end flanges and formed by said mated casing halves, regardless of the expected diameter deviation of the diameter of the catalyst carrier received in said casing and with said adjacent coupling wall portions having a sufficient amount of overlap to accommodate catalyst carriers of different diameters;

first and second short cylindrical tubes, each having the same diameter which is greater than a diameter of said, annular end flanges of said generally cylindrical casing and each having a radially inwardly extending flange surrounding an orifice which is in a plane perpendicular to said central axis, each short tube being individually affixed along an inner periphery of an outwardly facing surface of said flange of said tube to an adjacent outwardly facing surface of one of said annular end flanges of said generally cylindrical casing;

an elongate outer tube extending circumferentially about said central axis, said first and second short tubes having said cylindrical casing joined thereto between said first and second short tubes, and being received within said outer tube to form a heat insulating chamber between said cylindrical casing and said outer tube, said outer tube extending longitudinally beyond said short tubes to form at least two muffling chamber, one between said first short tube and a first end of said outer tube and another between said second short tube and a second end of said outer tube; and, a cushioning member being interposed between each of said first and second short tubes and said catalyst carrier.

3. An insulated, muffled, straight-line flow catalytic converter which is formed under a constant load for high quantity production, consisting essentially of:
- a generally cylindrical catalyst carrier having an approximate dimension of length and an approximate dimension of diameter which may be less than, greater than or equal to a desired diameter and which falls within an expected diameter deviation, and having a longitudinal central axis;
- a circumferential retainer member resiliently surrounding substantially the given length of said catalyst carrier;
- a first generally hemicylindrical casing half extending through approximately 180° about said central axis and terminating in a pair of longitudinal ends each having a radially extending annular end flange, said casing half being longer than the length of said carrier and terminating at the side edges thereof in a pair of longitudinally extending end faces, said casing half having on each side thereof a longitudinal flange extending substantially the length of said casing half, each longitudinal flange including a generally planar coupling wall portion having said longitudinally extending end face;
- a second generally hemicylindrical casing half extending through approximately 180° about said central axis and terminating in a pair of longitudinal ends each having a radially extending annular end flange; said second casing half being longer than the length of the carrier and terminating at the side edges thereof in a pair of longitudinally extending end faces, said second casing half having a radially outwardly extending longitudinal flange extending longitudinally substantially the length of said second casing half and having an inner face and each longitudinal flange terminating in a generally perpendicular flange including a generally planar coupling wall portion extending generally perpendicular to and substantially the length of said longitudinal flange and extending a tangential distance sufficient to overlap the adjacent coupling wall portion with a clamping margin between each end face of said coupling wall portion of said first casing and said inner face of said longitudinal flange of said second casing half defining a spacing which allows for different diameter catalyst carriers to be mounted within said first and second casing halves;
- said first casing half and said second casing half being adapted to retain and circumferentially surround said carrier and said retainer member when a predetermined load is applied with said adjacent coupling wall portions being in mating and overlapping relationship and with the distance of overlap being greater than said clamping margin but sufficient to retain said carrier in a fixed position within the cylindrical casing having said annular end flanges and formed by said mated casing halves, regardless of the expected diameter deviation of the diameter of the catalyst carrier received in said casing and with sufficient overlap between said adjacent coupling wall portions to accommodate catalyst carriers of different diameters;
- first and second short cylindrical tubes, each having the same diameter which is greater than a diameter of said annular end flanges of said generally cylindrical casing and each having a radially inwardly extending flange surrounding an orifice which is in a plane perpendicular to said central axis, each short tube being individually affixed along an inner periphery of an outwardly facing surface of said flange of said tube to an adjacent outwardly facing surface of one of said annular end flanges of said generally cylindrical casing;
- an elongate outer tube extending circumferentially about said central axis, said first and second short tubes having said cylindrical casing joined thereto between said first and second short tubes, and being received within said outer tube to form a heat insulating chamber between said cylindrical casing and said outer tube, said outer tube extending longitudinally beyond said sort tubes to form at least two muffling chambers, one between said first short tube and a first end of said outer tube and another between said second short tube and a second end of said outer tube and,
- cushioning members being interposed between the interior of said first and second casing halves, said catalyst carrier, and the inwardly extending flanges of said first and second short tubes.

* * * * *